May 25, 1943.　　　D. L. REYNOLDS　　　2,320,011
REPEATING MECHANISM
Filed Feb. 6, 1940　　　5 Sheets-Sheet 1

INVENTOR
Damian L. Reynolds
BY John Flam
ATTORNEY

May 25, 1943.  D. L. REYNOLDS  2,320,011
REPEATING MECHANISM
Filed Feb. 6, 1940   5 Sheets-Sheet 2

INVENTOR
Damian L. Reynolds
BY John Flam
ATTORNEY

May 25, 1943.  D. L. REYNOLDS  2,320,011
REPEATING MECHANISM
Filed Feb. 6, 1940  5 Sheets-Sheet 4

INVENTOR
Damian L. Reynolds
BY John Flam
ATTORNEY

May 25, 1943.　　　D. L. REYNOLDS　　　2,320,011
REPEATING MECHANISM
Filed Feb. 6, 1940　　　5 Sheets-Sheet 5

INVENTOR
Damian L. Reynolds
BY John Flam
ATTORNEY

Patented May 25, 1943

2,320,011

UNITED STATES PATENT OFFICE 2,320,011

REPEATING MECHANISM

Damian L. Reynolds, Burlingame, Calif.

Application February 6, 1940, Serial No. 317,609

8 Claims. (Cl. 172—239)

This invention relates to a system for distributing a liquid, and more particularly to a system for distributing water through a series of valves, and in predetermined sequence. Such systems for example, may be utilized for filling or emptying of containers as in manufacturing plants, such as breweries, refineries, distilleries, etc. A common use of the system is for irrigation purposes for parks, lawns, gardens, golf courses, or the like.

Irrigation systems for this general purpose are well known. Automatic controls have also been proposed, whereby at definite spaced intervals the valves are opened for a period, each passing water to one or more sprinkler heads. When they are a large number of heads, it has been proposed to provide a series of valves, opening and closing in succession, so that the available water pressure be utilized effectively.

It is one of the objects of this invention to provide a distributing system that performs these functions by simple and inexpensive apparatus.

It is another object of the invention to provide a system in which the valves controlling the sprinkler heads are ensured against leakage.

Weather during times of the year when rain, fog or cold are ordinary occurrences, requires that the automatic distributing system be capable of adjustment to comply with the irrigation requirements. For example, it may happen that for a period of days or even weeks, there should be no artificial irrigation at all. On the other hand, during periods of hot drouths, the amount of irrigation per day should be correspondingly increased. It is another object of my invention to make it possible easily to adjust the period of irrigation, and if desired, to shut down the system until required.

It is still another object of this invention to make it possible to open and close the valves in succession by the aid of a simple rotary master or distributor valve.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings.

In the present instance, the system is shown as utilized in connection with the distribution of water as for irrigating or sprinkling a lawn or garden or the like. Thus in Fig. 1 there is shown a water main 1 appropriately supplied from the usual pressure mains, not shown. This water main 1 is shown as provided with a number of branches 2, 3, 4, etc. Each of these branches is controlled by a valve 5, 6 or 7. The outlet side of each of these valves is intended to lead to one or more sprinkler heads appropriately distributed in the area to be irrigated.

Figures 1, 2, 3:
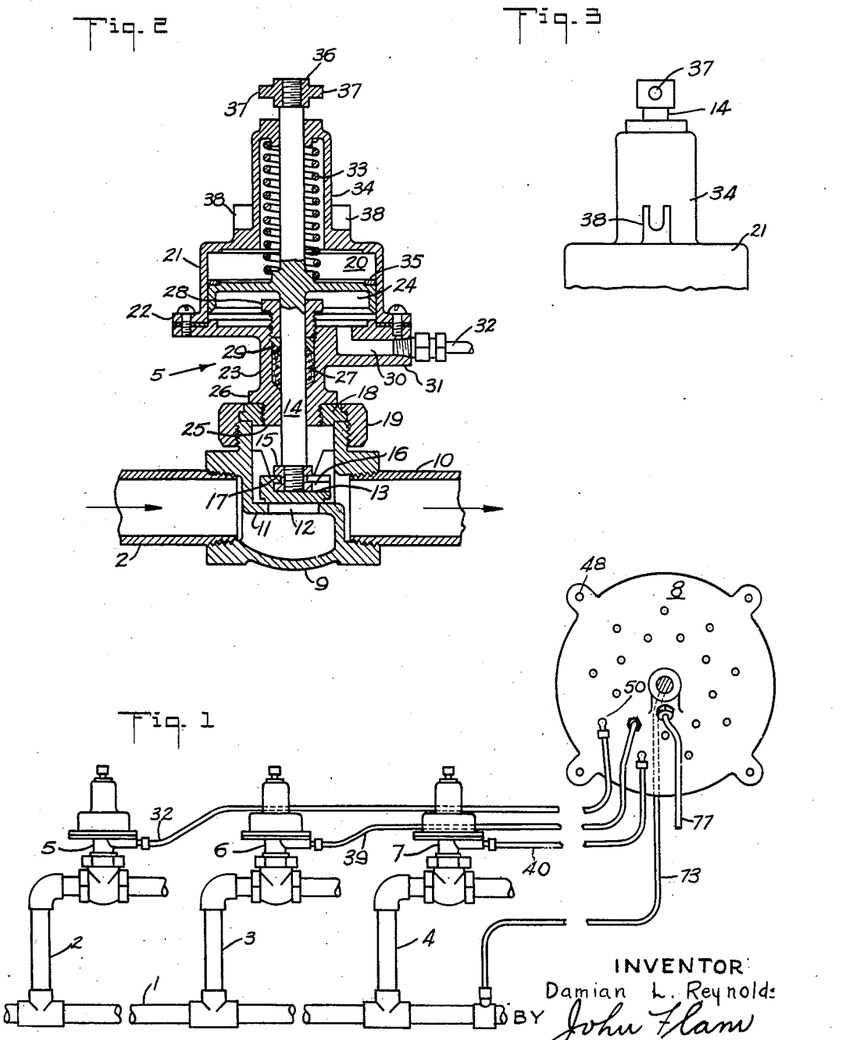
Figure 1 is a view, mainly diagrammatic, of a system incorporating the invention, and showing a series of valves, and a master valve or distributor controlling the valves in a cyclic manner.
Fig. 2 is an enlarged longitudinal sectional view of one of the valves of the series of Fig. 1.
Fig. 3 is a fragmentary side view of the valve structure illustrated in Fig. 2.

By the aid of the present arrangement the valves 5, 6, 7, etc. are opened and closed in succession in an automatic manner. Thus for example valve 5 may be opened and closed before valve 6 is similarly operated. Similarly after valve 6 is closed, valve 7 is caused to open, and so on until all of the valves have been operated. Such a complete series of valve operations, involving successive opening and closing of each of the valves in the series, will be termed a valve operating cycle in the following description.

The mechanism for causing the series of valves to be operated in this fashion is shown most clearly in Figs. 1, 2, 3, 7, 8 and 9. As will be apparent from the succeeding description, the distributor 8 is provided with a rotatable member which is moved by an appropriate source of motion to operate the valves in succession. For the opening of the valves, use is made of fluid pressure such as conveniently provided by water in the main 1. Before describing the mode of operation of the distributor 8, a typical valve structure 5 will be described illustrated in Figs. 2 and 3.

This valve structure includes a conventional type of valve body 9, having its inlet connected to branch 2 and having an outlet 10 proceeding to one or more sprinkler heads. This body 9 is shown as provided with a transverse valve seat 11 formed as a flange around a central aperture or opening 12. A valve closure member 13 of conventional form is adapted to seat upon the valve seat 11 and thereby to interrupt the passage of liquid from inlet 2 to outlet 10. This valve closure is shown as being detachably joined to the valve stem 14, which carries the flanged threaded collar 15. For this purpose, the closure member 13 is provided with a transverse slot 16 having an overhanging edge 17 adapted to be engaged between the flanges of the collar 15, and thereby the closure member 13 is restrained against material relative axial movement with respect to the stem 14.

The top of the valve body 9 is shown as supporting a flange 18 held securely in place by the nut 19 engaging the upper portion of the body 9. The stem 14 extends upwardly past the flange 18; it may be moved axially upwardly for lifting the valve closure 13 as desired.

For this purpose the flange 18 supports a fluid cylinder and piston mechanism, operating by fluid pressure to urge the stem 14 upwardly.

Thus for example the stem 14 may carry a piston 24. This piston is shown as operating in a cylinder chamber 20 formed in a cylinder body 21. The piston 24, being concentric with respect to the stem 14, is adapted to be acted upon by fluid pressure from below it and in an upward direction in order to lift the closure 13 from its seat 11.

The cylinder body 21 is conveniently supported by the aid of the flange 18. In this way a standard valve construction can readily be modified to provide a hydraulically operated valve structure. For example the body 21 may be provided with a flange 22 joined in fluid tight manner to a support 23. This support 23 also forms the lower wall of the cylinder chamber 20. It is provided with a central tubular portion terminating in a threaded end 25 engaging the flange 18. The tubular portion of member 23 may also be provided with a flange 26 engaging the top annular surface of flange 18.

The stem 14 is shown as passing through the support 23 and joined integrally to the piston 24. In order to insure that the cylinder chamber 20 and the valve body 9 be separated in fluid tight manner, a packing gland construction may be utilized in support 23. Thus the packing 27 is disposed around the stem 14 and within the sleeve portion of support 23. It is urged into sealing contact by the gland nut 28 and the ring 29.

Water under pressure is intended to be admitted beneath the piston 24. This water may be conducted, for example, by the aid of the port 30 extending through the boss 31 shown as integral with the support 23. To the port 30 is coupled the conduit 32 leading to the distributor 8 (Fig. 1).

Upon release of fluid pressure the stem 14 is urged downwardly, as for example by the aid of a compression spring 33. This spring is housed in a sleeve-like extension 34 projecting above the cylinder body 21. When liquid under pressure is permitted to pass through the port 30, this spring 33 is compressed by upward motion of piston 24; but as soon as the pressure is released, the force of spring 33 is sufficient to return the valve to closed position.

In order to prevent leakage of liquid past the piston 24 upwardly into the chamber space 20, use is made of an annular sealing ring 35 attached to the top edge of piston 24. This sealing ring is intended to engage the upper surface of chamber 20 and to seal against it when the valve is in open position. The sealing ring may be of soft material, such as soft metal, felt, or the like. By its use the necessity of expensive piston rings is obviated.

At times it may be advantageous to open the valve manually. For this purpose the stem 14 projects upwardly from the body 21 and is shown as carrying a nut 36 with opposed radial pins 37 (Figs. 2 and 3). Furthermore, adjacent the base of the projection 34 there are a pair of diametrically slotted bosses 38. These form trunnions or fulcrum bearings. Into the slots may be placed the bearing pins for a lever that operates upon the pins 37 for lifting the stem 14, thereby manually operating the valve.

The manner in which water under pressure may be supplied in succession to the conduits, such as 32, 39, 40, etc., may best be explained in connection with Figs. 7, 8 and 9. The distributor 8 is shown as comprising a body member 41 and a cooperating flange or cover 42. These two members 41 and 42 may be joined together by the aid of screws 43 passing through the outer flanges 44 and 45 provided on members 41 and 42. In order to render the space defined by members 41 and 42 fluid tight, an appropriate ring gasket 46 may be interposed between the flanges 44 and 45.

Conveniently the distributor structure may be supported upon the front wall 47 of the panel structure, as by the aid of four bolts 48. These bolts 48 are shown as passing through spacer sleeves 49 interposed between cover 42 and the sheet metal wall 47.

From each of the valves 5, 6, 7, etc. a conduit such as 32, 39 or 40 leads to apertures or ports 51 in the cover member 42, as by the aid of elbows, such as 50. As shown most clearly in Figs. 1 and 8, the apertures or ports 51 are formed in the cover member 42, and are located on two concentric circles and in staggered relation. By the aid of a rotatable valving member 52, these apertures or ports, and therefore the conduits 32, 39, 40, etc., may be placed in succession and cyclically into communication with a source of water pressure.

This rotary member 52 is shown in the present instance as being rotatably supported by the aid of an integral shaft 53 journaled in a sleeve or bearing 54 formed on the cover member 42. The member 52 has a diameter coextensive with the diameter of the chamber formed by the body member 41 and cover member 42 and forms a fluid tight fit against the cover member 42, as by appropriate grinding of the contacting surfaces. By rotating shaft 53 in a manner to be hereinafter described, the rotary member 52 is caused, in succession, to pass fluid under pressure to the conduits 32, 39, 40, etc.

For this purpose the member 52 provides a radial conduit 56, in a radial rib 44. Conduit 56 is adapted to be supplied with water under pressure in a manner to be hereinafter described. Leading into the radial conduit 56 are a pair of radially spaced apertures 57 and 58. The radial separation of these apertures 57 and 58 corresponds to the radial spacing of the concentric circles on which are located the centers of the apertures or ports 51 in cover 42.

The left hand surface 59 of the rotatable member 52 is urged in fluid tight manner against the inner surface of cover 42, in a manner to be hereinafter described. As rotatable member 52 is rotated by shaft 53, first one aperture 57 will align with a port 51; upon continued rotation, say in a clockwise direction, the other aperture 58 will be later aligned with a port 51. It is thus seen that as member 52 is rotated, aperture 57 will in succession become aligned with those ports 51 that are located on the outer circle in cover 42; and the aperture 58 will in succession be aligned with those ports 51 which are located on the inner circle of cover 42. Since these ports 51 are staggered, as heretofore explained, the apertures 57 and 58 are alternatively active, only one conduit such as 32, 39, 40, etc., being in communication at a time with the port 56 in the rotatable member 52.

The manner in which water under pressure is passed to the port 56 in member 52 will now be described. The body member 41 is shown as provided with a rearwardly extending boss 60. If desired, a series of stiffening vanes or ribs 61 may also be provided. The rotary member 52 is provided with a rearwardly extending member 62 projecting through the boss 60. It is provided with a central or axial aperture 63 communicating with the port 56. Furthermore, a boss 64 may be formed integrally with the member 52 providing a sliding guide within the sleeve 60. This sleeve also houses a compression spring 65 by the aid of which the member 52 is urged toward the left into fluid tight relationship with the cover 42. The right hand end of this compression spring 65 is shown as abutting a collar 66 slidably mounted in the boss 60. It is limited against movement toward the right by the end flange of sleeve 60. The left hand end of spring 65 is shown as abutting against a similar collar 67 slidable in the boss 60, and abutting the boss 64 of member 52.

The axial extension 62 passes through a gland structure 68. This gland structure is carried on a flange 69 (Fig. 5) attached to the end of boss 60. The gland 68 includes the seal 70 disposed around the extension 62, and the gland nut 71. Into the end of this gland nut is affixed an elbow 72 to which is connected the conduit 73. This conduit 73, as shown most clearly in Fig. 1, connects directly to the water main 1.

Water under pressure, therefore, is continually supplied through conduit 73 and nut 71 to the passage 63 and port 56. The surfaces of contact between the rotating element 52 and cover 42, being ground to provide an accurate fit, prevent material leakage of liquid past the rotatable member 52. The spring 65, of course, assists in maintaining fluid tight contact between the cover 42 and member 52.

Provisions are made for releasing the pressure of the liquid in the conduits 32, 39, 40, etc., when it is desired to close the corresponding valves; and this occurs when the rotatable member 52 is moved out of register with the corresponding conduit. For this purpose the member 52 is provided with another pair of drain apertures 74 and 75 (Figs. 8 and 9). These apertures are angularly spaced respectively from apertures 57 and 58 by an angle equal to the angular spacing between adjacent ports 51. Thus as member 52 is moved so as to align one or the other aperture 57 or 58 with the port 51, a corresponding aperture 75 or 74 is placed in communication with that conduit of the series of conduits 32, 39, 40, etc., which had been just supplied with water under pressure. Accordingly the water can drain from that conduit through one of the apertures 74 or 75, into the space defined by body 41 and cover 42, and thence through conduit 76 to the drain. A branch draining conduit 77 is also illustrated extending to an aperture 78 in the cover 42, and in communication with a recess 79 formed in the left hand portion of member 52. This drain conduit 77 and aperture 78 are provided to ensure the drainage of any liquid that may possibly leak past the member 52.

Figure 8:
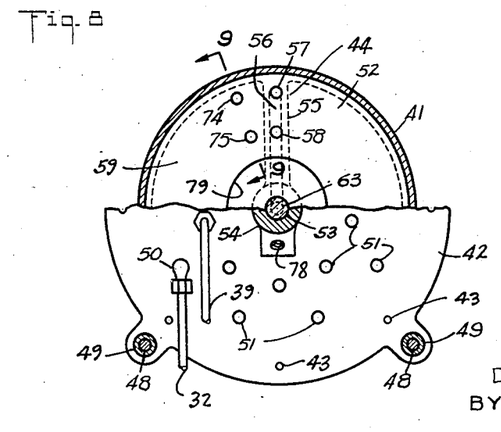
Fig. 8 is a sectional view taken along plane 8—8 of Fig. 7.
Figure 9:
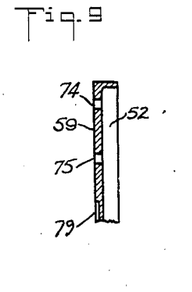
Fig. 9 is a fragmentary sectional view taken along plane 9—9 of Fig. 8.

The distributor mechanism just described is so arranged that the rotary member 52 is given a step by step motion in a clockwise direction, as viewed in Fig. 8. The angular extent of each motion is such as to correspond to the angular spacing of the ports 51. In this way, as heretofore explained, one port 51 is in communication with the liquid supplying port 56 and that port next to it in a counterclockwise direction is in communication with the draining conduit 76. As the step by step motion continues, the valves are thus caused to open and to close in succession.

Figure 4:
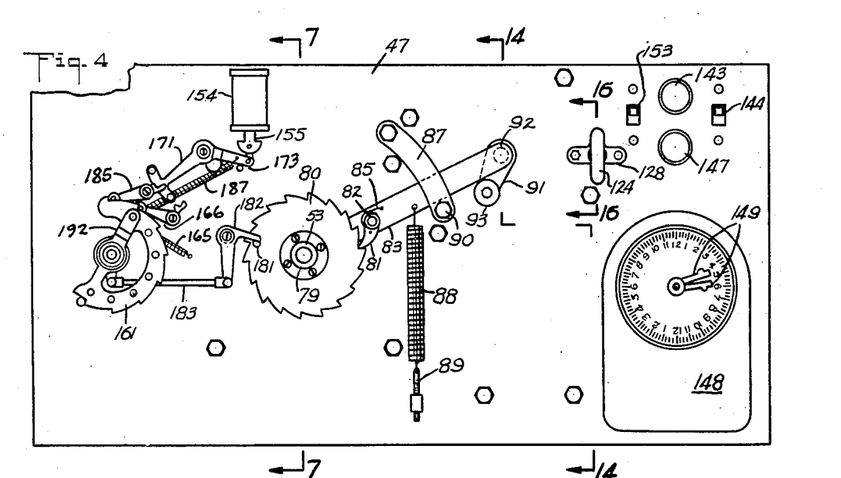
Fig. 4 is a front view of the control panel upon which the apparatus is supported for controlling the actuation of the valves in the distributing system.
Figure 7:
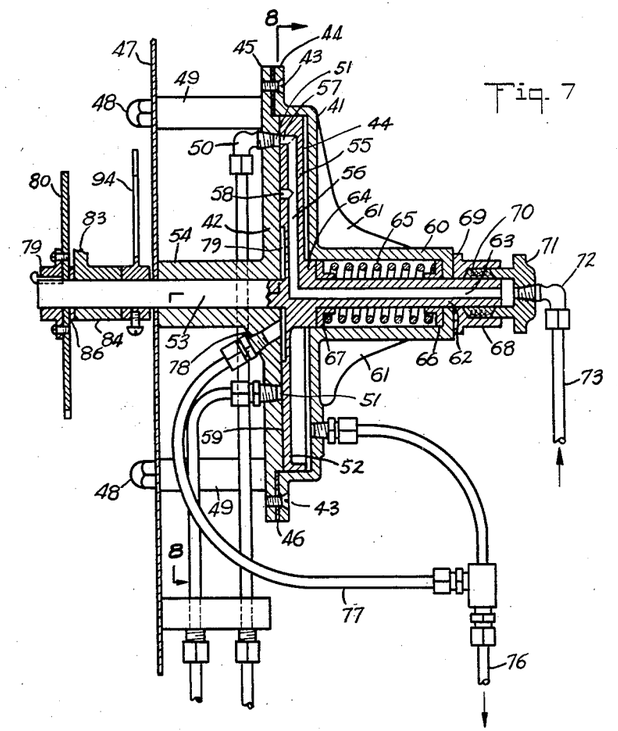
Fig. 7 is an enlarged sectional view taken along plane 7—7 of Fig. 4; this figure shows the structure of the master valve or distributor mechanism.

The mechanism for imparting the step by step motion to the shaft 53 which carries the rotary member 52 may be best understood by reference to Figs. 4 and 7. The shaft 53 has keyed to it a hub 79. This hub is shown as attached to a ratchet wheel 80. This ratchet wheel is adapted to be advanced in a clockwise direction, as viewed in Fig. 4, by the aid of a pawl 81. This pawl is shown as pivotally mounted on a pin 82 carried by a lever 83. This lever 83 is mounted for free rotation on the shaft 53, as by the aid of the bearing boss 84. The pawl 81 may be appropriately urged, as by a helical spring 85, into engagement with the teeth of the ratchet wheel 80. As shown most clearly Fig. 7, a spacer washer 86 is interposed between the ratchet wheel 80 and the hub or boss 84 of lever 83.

The lever 83 extends radially for a considerable distance from the axis of shaft 53. It is restricted in its angular motion by the stop guide 87 fastened to the front wall 47 and forming with this wall an opening through which the lever 83 extends.

Lever 83 moves the ratchet wheel 80 in a clockwise direction by aid of the pawl 81, when the lever is moved in a clockwise direction by the aid of the tension spring 88. This tension spring is anchored at its top end to the lever 83. Its lower end is anchored in an adjustable anchor 89 supported on the wall member 47. During the period of inactivity of lever 83, spring 88 urges it against a stop formed by the screw 90 which serves to support the stop member 87.

Figure 14:
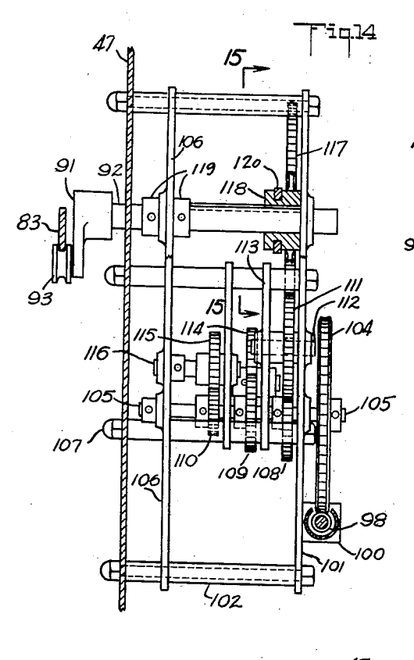
Fig. 14 is an enlarged sectional view taken along plane 14—14 of Fig. 4.

The counterclockwise actuation of lever 83 is effected by the aid of a crank 91 (Fig. 14). This crank 91 is supported on a shaft 92 rotated by a source of motion as hereinafter described. It is sufficient for the present to note that the crank 91 carries a crank roller 93 contacting the lower edge of the lever 83. As the crank shaft 92 rotates in a clockwise direction, it is apparent that once each revolution it will impart a counterclockwise motion to the lever 83 against the tension of spring 88. Of course, for this motion, the spring pressed pawl 81 simply rides over the teeth in the ratchet wheel 80.

As soon as the crank roller 93 passed out from under the lever 83, spring 88 is free to act to return the lever 83 to the position indicated in Fig. 4. This return movement is effective through pawl 81 to rotate the ratchet wheel 80 by one tooth. The angular movement thus secured is that which is required to cause the rotary member 52 of the distributor 8 to be moved through an angle corresponding to the angular spacing of the ports 51.

The continued rotation of crank shaft 92 obviously causes the distributor mechanism to be progressed in a step by step manner. This step by step mechanism serves to operate the valves in the system in a cyclic manner and the cycles continue one after another so long as crank shaft 92 is operated. As will be described hereinafter, motion of this crank shaft 92 is determinable, so as to stop the mechanism after a certain number of complete cycles of operation has been completed. One cycle, of course, corresponds to one complete revolution of the ratchet wheel 80. If desired, a pointer 94 (Fig. 7) may be attached to the shaft 53 to indicate upon appropriate marks on the wall 47 which one of the valves 5, 6, 7, etc. is open. The position of the shaft 53 determines which of the ports 51 is in communication with the source of water pressure; therefore, pointer 94 may indicate which port 51 is open.

The rate of rotation of crank shaft 92 obviously determines the length of time for which each of the valves 5, 6, 7, etc. is maintained open, when operated in each cycle. In the present instance the period required for one complete rotation of this crank shaft lever can be adjusted, the shortest period being of the order of four minutes, and the longest period, of the order of six minutes. The gear train and the source of motion for operating it are shown most clearly in Figs. 5, 14, 15, 16 and 17.

Figure 5:
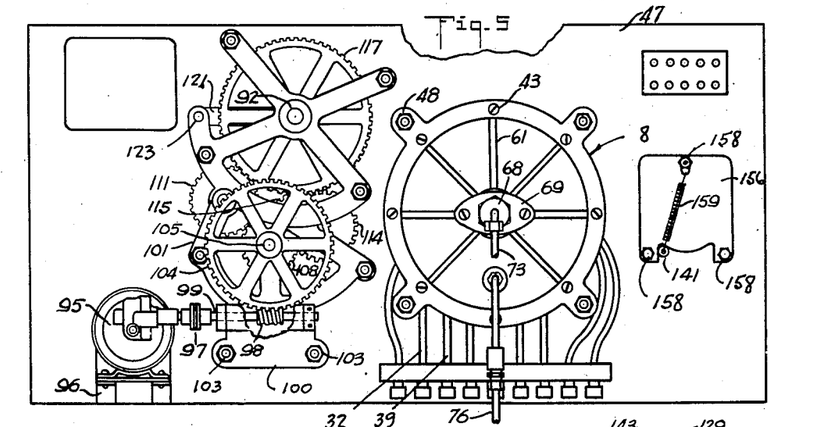
Fig. 5 is a rear view of the panel shown in Fig. 4.

In the present instance the source of motion for rotating the crank shaft 92 is represented by a small electric motor 95 (Fig. 5). This motor is shown as supported appropriately upon a bracket 96 fastened to the rear of the wall 47. The electric motor 95 is shown as driving a worm 98 through coupling 97, and shaft 99, appropriately journaled in a bracket 100. As shown most clearly in Fig. 14, this bracket 100 is supported on a plate 101, in spaced parallel relation with the front wall 47. Spacer sleeves 102 and bolts 107, serve to support the plate 101 on wall 47. The worm 98 is shown as driving a worm wheel 104 fastened to a shaft 105. This shaft, as shown most clearly in Fig. 14, is appropriately journaled in the plate 101 and another plate 106 spaced apart by appropriate spacers on the bolts 103, 107, thus supported on the front panel 47.

Reduction gearing from shaft 105 to the crank shaft 92 can be provided by any conventional type of change gear mechanism for varying the ratio of transmission. In the present instance the shaft 105 is shown as carrying three axially spaced gears 108, 109 and 110 of decreasing sizes. Gear 108 meshes with a gear 111 (Fig. 5). This gear 111 is mounted on its own shaft 112, appropriately supported in the plate 113 and on the plate 101. Plate 113 is supported similarly to plates 101 and 106.

Gear 109 immediately back of gear 108 is in mesh with gear 114, also mounted on its own independent shaft. Finally the gear 110 is in mesh with still another gear 115, also independently mounted on its shaft 116. The three gears 111, 114 and 115 are so arranged as optionally to drive a gear wheel 117 in driving relation with the crank shaft 92. The gear wheel 108, being the largest, will drive the shaft 92 at maximum speed, and similarly gear wheel 110 being the smallest, will drive the crank shaft 92 at the slowest rate through its intermediate gear 115.

The gear wheel 117 is accordingly made slidable on shaft 92 so that it may readily be placed in mesh with either one of the three gears 111, 114 and 115. For this purpose its hub 118 is splined to the shaft 92. The shaft 92 is restrained against axial motion by the aid of the collars 119 fastened to the shaft 92 and supported on opposite sides of the intermediate frame member 106.

Figure 15:
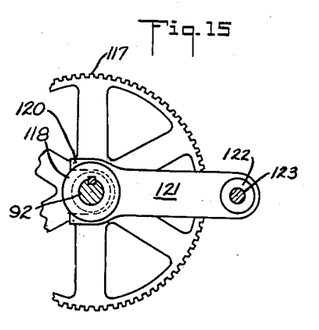
Fig. 15 is a fragmentary sectional view taken along plane 15—15 of Fig. 14.
Figure 16:
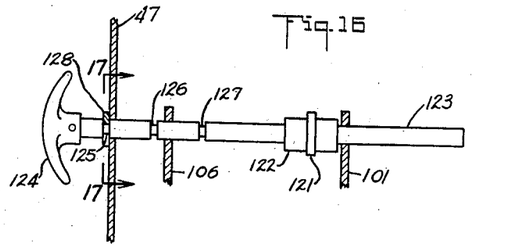
Fig. 16 is a sectional view taken along plane 16—16 of Fig. 4.
Figure 17:
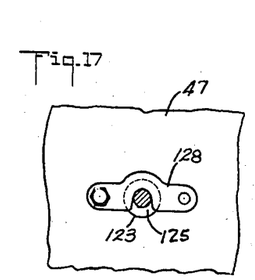
Fig. 17 is a fragmentary view taken along plane 17—17 of Fig. 16.

The manner in which the gear wheel 117 may be adjusted is indicated more clearly in Figs. 15, 16 and 17. Thus hub 118 for gear wheel 117 is provided with an annular groove in which is accommodated the shift fork arms 120. The shift fork 121 extends radially of the shaft 92. At its radial extremity it is provided with sleeve 122 through which passes the shift rod 123. This shift rod supports the fork 121, and passes through the frame elements 101 and 106, as well as through the front wall 47. At its front end it carries the handle member 124. By axial movement imparted to the rod 123 by the aid of handle 124, the shift fork 121 can be moved in a direction such as to adjust the axial position of gear 117. In order to lock the gear 117 in any set position, the rod 123 is provided with the reduced portions or locking grooves 125, 126 and 127. Into these grooves may drop the locking lever 128 pivoted to the front wall 47. The lock lever 128 may be lifted to unlock the shift rod 123. The rod 123 can then be adjusted as desired, and the locking lever 128 rotated into locking position with any one of the three grooves 125, 126 and 127.

As thus far described, it is seen that the distributor mechanism 8 is driven by the electric motor 95. As long as the electric motor 95 is active, the distributor mechanism continues to operate, and cyclic valve operation continues. The number of complete rotations of ratchet wheel 80 corresponds to the number of cycles of operation of the valve system.

The arrangement is such, however, that the motor 95 may be automatically timed so that it will be actuated only at a definite time, and also its period of operation corresponding to a definite number of cycles may also be predetermined. Thereafter the motor 95 is deenergized and is not again energized until the timing device is again active. The automatic control of motor 95 can be best described in connection with Figs. 4, 6, 10, 11, 12 and 13.

Figure 6:
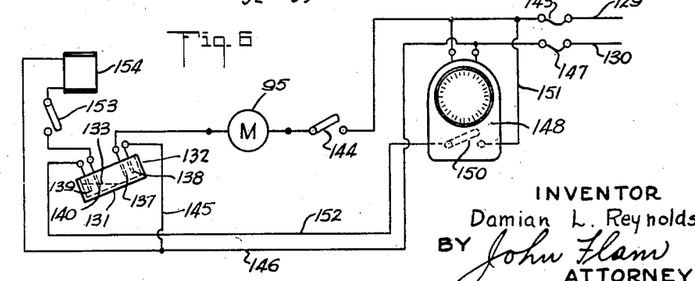
Fig. 6 is a wiring diagram of the control mechanism.

As shown most clearly in Fig. 6, the circuit for motor 95 may be completed across electric mains 129 and 130 through a circuit control mechanism 131. This circuit control 131 (Figs. 11 and 12) is shown in the present instance as being in the form of a mercury dump switch. This mechanism includes a mercury well 132 and a body of mercury 133 therein. This well 132 is provided with a support 134 fastened as by key 135 to a rocking shaft 136.

The body of mercury 133 is adapted to complete either of two circuits. Thus at the right hand portion of the device 131 are the pair of contacts or electrodes 137 and 138, immersed in the mercury well 132, when it is in the position of Fig. 12. The circuit is completed between these two electrodes by the body of mercury. However, when the mercury well 132 is rocked from the position of Fig. 12 to the position of Fig. 6, the circuit between electrodes 137 and 138 is interrupted, and the circuit between the other pair of electrodes or contacts 139 and 140 is completed. The manner in which the rocking shaft 136 is moved to either of the two positions illustrated in Figs. 12 and 6 will be described hereinafter. For the present it is sufficient to note that electrodes 137 and 138 control the circuit for the source of motion 95. Thus when circuit is completed through electrodes 137 and 138, the motor circuit 95 may be traced as follows: from main 129 through fuse 143, overriding switch 144 (which may be in the form of an ordinary toggle switch or snap switch), motor 95, electrodes 137 and 138, connections 145 and 146, fuse 147, back to main 130.

Figure 12:
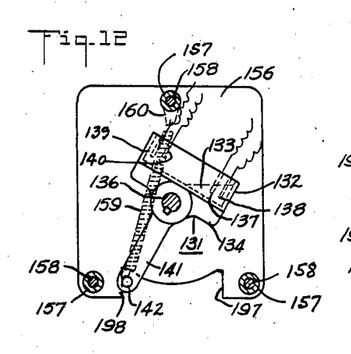
Fig. 12 is a sectional view taken along plane 12—12 of Fig. 11.

It is clear that this circuit can be completed only when the mercury switch is in the position of Fig. 12 and when the overriding switch 144 is closed. This switch 144 is provided to make it possible to shut down the operation of the mechanism for as long a period as desired.

The placing of switch 131 in the position of Fig. 12 to complete the circuit just traced, is dependent upon the operation of an electric time switch mechanism 148. This mechanism may have adjustable pointers 149. By the aid of these pointers, the time when a circuit controller or time switch 150 is closed may be set. When the set time arrives the switch 150 closes. This in turn causes an intermediate circuit to be closed, which in turn operates to dump the switch 131 from the position of Fig. 6 to the position of Fig. 12. This intermediate circuit may be traced as follows: from main 129, fuse 143, connection 151, switch 150, connection 152, contacts 139 and 140, overriding switch 153, electromagnet or solenoid 154, and connection 146, fuse 147, back to main 130. The overriding switch 153 is provided in the solenoid circuit in order to make it possible to render the time switch totally inoperative. This may be desirable when long periods of inactivity of the device is intended. For short periods of interruption the motor overriding switch 144 may be manipulated.

The time switch mechanism 148 is preferably of the self-starting synchronous type with a twenty-four hour dial, making it possible to determine what time of a twenty-four hour day the irrigation system is to begin its operation.

The energization of solenoid 154 causes the core 155 of the solenoid to operate the dump switch 131 mechanically and to place it in the position of Fig. 12. As soon as this occurs, the solenoid 154 is deenergized and is not again energized until the time switch 150 is operated again. However, once the motor 95 is operated, it causes ratchet wheel 80 to be rotated through a predetermined number of revolutions, corresponding to the number of complete cycles of valve operations that are to be performed.

The manner in which the repeater mechanism, shown in Figs. 10, 11, 12 and 13, operates to effect this result will now be described.

Referring to the dump switch mechanism 131, (Figs. 11, 12 and 13), rocking shaft 136 is pivotally supported on frame members 155 and 156. These frame members are appropriately supported on the wall 47, as by the aid of the spacer sleeves 157 and the through bolts 158. The support 134 for the dump switch 131 carries an integral depending arm 141. At the free end of the arm 141 there is a pin 142 which projects beyond the frame elements 156. This frame member has opposite stop surfaces 197, 198 in the path of pin 142, for limiting the motion of shaft 136 to a restricted angle. Pin 142 also serves as an anchor for one end of a tension spring 159. The upper end of this tension spring is anchored in an anchor hook 160 attached to the frame element 156 by one of the bolts 158.

The anchor 160 (Fig. 12) for spring 159 is so located, that rotation of the rock shaft 136 in a counterclockwise direction, first of all causes the spring 159 to be elongated. The maximum elongation occurs when the opposite ends of spring 159 and the axis of shaft 136 are in alignment; in the example shown, when the spring axis is vertical. Beyond that point, the rock shaft 136 is rapidly snapped over center by the contractile force of the tension spring 159. The dump switch then takes the position of Fig. 6. The reverse action, back to the position of Fig. 12 is accomplished by rotating the rocking shaft 136 past center in a clockwise direction until the tension of spring 159 can serve to snap the dump switch 131 to the position of Fig. 12.

The manner in which the rocking shaft 136 is thus snapped over center in one direction or the other will now be described. The snapping over action to energize the motor 95 occurs immediately upon energization of the solenoid 154. The motor is then energized and continues to be energized until a certain number of rotations of ratchet wheel 80 occurs. Thereupon the rocking shaft 136 is rotated from the position of Fig. 12 to interrupt the motor circuit. At the same time, it is preset to complete the solenoid circuit, as soon as the time switch 150 is closed for the succeeding day's operation of the system.

Figure 11:
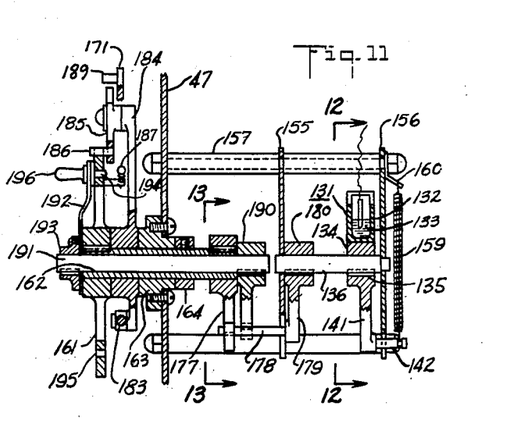
Fig. 11 is a sectional view taken along plane 11—11 of Fig. 10.

The repeater mechanism, predetermining or limiting the number of revolutions of ratchet wheel 80, includes a repeater segment wheel 161. This repeater segment wheel is arranged to be advanced by a unit of angular motion after the completion of each revolution of the ratchet wheel 80. The segment wheel 161 for this purpose is arranged to be advanced in a counterclockwise direction about the axis of a hollow sleeve 162 (Fig. 11). The wheel 161 is keyed to this sleeve. It is journalled in the bearing boss 163 fastened to the front wall 47. A collar 164 fastened to the sleeve 162 prevents axial motion of sleeve 162 toward the left, as viewed in Fig. 11.

The segment wheel 161 is constantly urged in a clockwise direction by the aid of a spring 165. However, it may be restrained from clockwise motion by the aid of a stopping pawl 166. This stopping pawl carries a pin 167 adapted to engage the shoulder of one of the teeth 200 provided in the segment 161. This stopping pawl 166 is pivotally supported on the wall 47, as by the aid of the screw 168. The pawl 166 is provided with a releasing arm 169. This releasing arm is in the path of a pin 170 carried on a movable lever 171, pivoted by the aid of a bolt 172 on the wall 47.

Lever 171 is arranged to be actuated to release pawl 166 when the time switch 150 is closed, to cause initiation of the operation of the system. The motion of segment wheel 161 under the influence of spring 165, causes dump switch 131 to attain the position of Fig. 12. The lever 171 has an arm 173 joined as by a link 174 to the core 155 of electromagnet or solenoid 154, as shown most clearly in Fig. 10. When the solenoid 154 is energized, by closing of switch 150, the lever arm 173 is lifted from stop pin 175 and ultimately pin 170 engages the releasing arm 169. When this occurs the pawl 166 is lifted out of the path of the teeth on segment wheel 161. This segment wheel then is actuated by the spring 165 to the position of Fig. 10; it is stopped in that position by a stop pin 176 attached to the wall 47.

Figure 13:
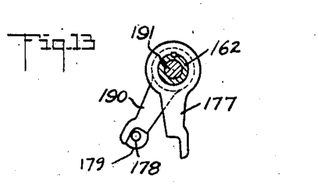
Fig. 13 is a sectional view taken along plane 13—13 of Fig. 11.

The manner in which this rotation of the segment 161 serves to dump the switch 131 to the position of Fig. 12, will now be described. For this purpose sleeve 162 has keyed to it an arm 177 (Figs. 11 and 13). The end of this arm is arranged to contact a pin 178 carried on the end of a lever 179. This lever has a hub 180 fastened to the rocking shaft 136. Thus rotation of wheel 161, through lever 177, pin 178, and lever arm 179, can rock the shaft 136 in a clockwise direction as viewed in Figs. 12 and 13.

In the position of Fig. 13 the pin 178 and lever 179 has been urged by lever 177 to the over center position, permitting the spring 159 to rock the support 134 to the position of Fig. 12. It is thus seen that upon release of the segment wheel 161 by lifting of pawl 166, the dump switch 131 serves to close the circuit for motor 95. At the same time, the circuit for solenoid 154 is interrupted through contacts 139 and 140, and accordingly the holding pawl 166 will be returned to the position of Fig. 10. The lever 171 is also returned to this inactive position, as by spring tension applied in a manner to be hereinafter explained.

Figure 10:
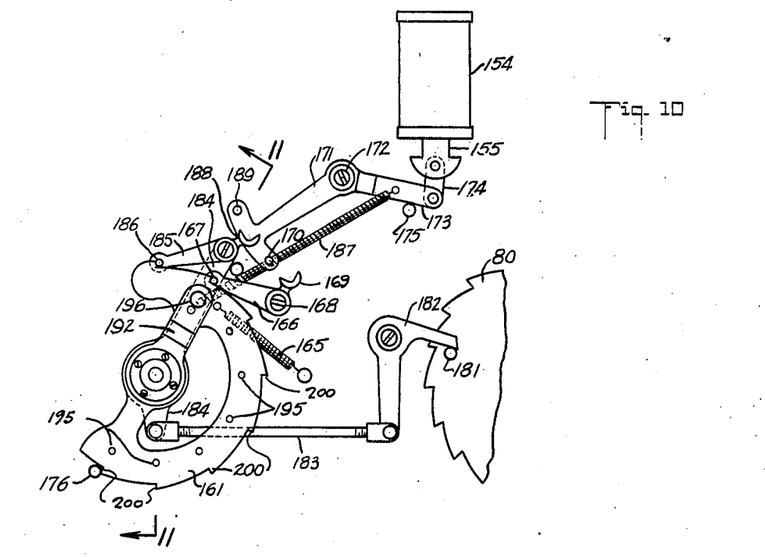
Fig. 10 is an enlarged front elevation showing particularly the repeater mechanism by the aid of which the number of times the cycle of valve operations is repeated may be determined.

The segment wheel 161 is arranged to be advanced step by step in a counterclockwise direction from the position of Fig. 10 in response to each completion of a cycle of valve operation. For this purpose the ratchet wheel 80 is provided with a pin 181 projecting outwardly from the face of the ratchet wheel. For each revolution of the ratchet wheel 80, the pin 181 operates bell crank lever 182 appropriately journaled on the wall 47. This bell crank lever 182 is intended to operate upon a connecting link 183, which may be adjustable to correspond with the requirements. This link 183, as shown most clearly in Figs. 10 and 11, is connected to a lever 184. This lever 184 is mounted for free rotation upon the sleeve 162 and is placed intermediate the hub of segment wheel 161 and bearing boss 163.

At its upper end this lever 184 pivotally carries an advancing pawl 185. This advancing pawl has a tooth engaging pin 186 adapted to engage the teeth 200 of the segment wheel 161.

From the foregoing it is seen that after each rotation of ratchet wheel 80, the segment wheel 161 is arranged to be advanced in a counterclockwise direction to the extent of one tooth. A spring return is provided for the pawl lever 184. For example, a tension spring 187 may be anchored between lever arm 173 and the lever 184 in order to apply proper return forces to both of these elements.

Furthermore, when solenoid 154 is energized, the advancing pawl 185 is released at the same time that the holding pawl 166 is released. For this purpose the advancing pawl 185 has an arm 188 in the path of a pin 189 carried at the end of lever 171. When lever 171 is rotated in a counterclockwise direction against the tension of spring 187 by the motion of core 155 upwardly, the pin 189 will engage the arm 188 and rotate the pawl 185 out of engagement with the wheel 161. Simultaneously the holding pawl 166, as heretofore explained, is also released.

The energization of the solenoid 154 to effect this result is accomplished only when time switch 150 is closed. However, as wheel 161 is advanced in a counterclockwise direction, it ultimately causes dump switch 131 to open the circuit of motor 95.

The operation of the dump switch 131 to move it to the motor circuit opening position of Fig. 6 is accomplished by the aid of a lever 190 (Figs. 11 and 13), fastened to a shaft 191 that is also coupled to the segment wheel 161 so as to be rotated thereby. Lever 190, upon sufficient counterclockwise rotation of shaft 191 engages the pin 178 and carries it past the over center position, causing the dump switch to move to the position of Fig. 6. The relative angular positions of levers 177 and 190 are adjustable by the aid of the mechanism now to be described. By this means the number of cycles of valve operation may be predetermined, for this relative angular position determines the required angular motion of wheel 161 in a counterclockwise direction to operate switch 131.

Shaft 191 thus carries an adjusting spring lever 192, as by the aid of a hub 193 keyed to shaft 191. This lever 192 carries an adjusting pin 194 adapted to engage in any one of a number of apertures 195 in the segment wheel 161. For ready manipulation of the shaft 191, a handle 196 is provided, by the aid of which the pin 194 may be disengaged from any of the apertures 195 and shaft 191 rotated relative to sleeve 162, to align the pin 194 with any other aperture 195. There are as many pin retaining apertures 195 as there are teeth 200; thus the angular separation of levers 177 and 190 corresponds to the number of times the segment wheel 161 must be advanced by the angular spacing of the teeth to cause lever 190 to move rocking lever 136 to the switching position of Fig. 6. Thus for the setting shown in Figs. 10 and 13, but one cycle of operation is required to dump the switch 131 to the position of Fig. 6. By moving pin 194 into any of the succeeding apertures 195, the number of cycles performed before operating switch 131 may be chosen to be greater than one.

Thus adjusting the angular spread between these two levers 177 and 190 (Fig. 13), determined when the lever arm 190 engages pin 178 to interrupt the circuit for motor 95 by moving switch 131 to the position of Fig. 6. At the same time the circuit for solenoid 154 is preset for the next period of operations, through contacts 139, 140.

By appropriate choice of the angular spacing of the teeth on segment wheel 161, and by appropriate adjustment of the advancing mechanism, it is seen that it is possible to cause an advancement of segment wheel 161 to the extent of one tooth for each revolution of the ratchet wheel 80.

A brief summary of the mode of operation may now be set forth. When the apparatus is inactive, awaiting the time when the time switch 150 is to close, the switch 131 is in the position of Fig. 6; that is, the motor circuit 95 is opened. The segment wheel 161 is in a position advanced from that of Fig. 10; that is, it had been rotated to a position such that the lever 190 had dumped the switch 131 to the position of Fig. 6. Now when the time switch 148 closes the circuit controller 150, the solenoid 154 is energized. This immediately causes the release of pawls 185 and 166 and the segment wheel 161 returns to the position of Fig. 10. This motion also causes lever 177 to actuate, by the aid of pin 178, the rock shaft 136. The dump switch 131 then assumes the position of Fig. 12. As soon as this occurs, the solenoid circuit is interrupted at contacts 139 and 140 and the motor circuit is established at contacts 137 and 138. The motor 95 then begins to rotate the rotary member 52 of the distributor 8 through the train of gearing illustrated in Fig. 14. For each revolution of the rotary member 52 a cyclic operation of all of the valves 5, 6, 7, etc. is accomplished. For each revolution of the ratchet wheel 80 the segment wheel 161 is advanced by one tooth in a counterclockwise direction. After a predetermined number of cycles, determined by the setting of lever 192 carrying the pin 194, the lever 190 causes the dump switch 131 to return to the position of Fig. 6. However, the solenoid circuit is not again energized because by that time the time switch 148 is opened. Accordingly the solenoid circuit is not energized again until the succeeding energization of the time switch 148. At that time the operation just described is repeated.

The number of cycles of valve operation is readily adjusted by the mechanism illustrated in Figs. 10 and 11. The period of operation of each valve in the system is adjusted by adjusting the shift rod 123 shown in Fig. 16. The system, although flexible, is substantially entirely automatic. It requires little attention and is reliable in operation.

What is claimed is:

1. In a repeating mechanism, a rotatable assembly comprising a pair of rotatable members, means for locking said members to rotate together, said means enabling adjustment of the relative angular position of the members, means forming a stop for said assembly, means resiliently urging the assembly against said stop, a cyclic device adapted to rotate said assembly in a step by step manner away from said stop, and means actuated upon the arrival of said members to definite angular positions for controlling the operation of said cyclic device.

2. In a repeating mechanism, a rotatable assembly comprising a pair of rotatable coaxial members, means for locking said members to rotate together, said means enabling adjustment of the relative angular position of the members, means forming a stop for said assembly, means resiliently urging the assembly against said stop, a cyclic device adapted to rotate said assembly in a step by step manner away from said stop, a pair of arms respectively secured to said members and extending radially therefrom, the extremities of said arms being angularly spaced, and means for controlling the operation of said cyclic device and actuated by a member interposed between said arms, one of said arms serving to actuate the control means to initiate operation of the cyclic device, the other arm serving to actuate the control means to stop operation of said device.

3. In a repeating mechanism, an assembly comprising a pair of rotatable members, means for optionally locking said members for simultaneous rotation, said means permitting adjustment of the relative angular position of the members, a cyclic device, a releasable connection whereby said device rotates said assembly in a step by step manner, means resiliently urging the assembly to rotate in a direction opposite to the rotation caused by said device, a stop for limiting rotation of the assembly in response to said last mentioned means, latch means preventing rotation of said assembly in response to said urging means, means for simultaneously releasing said connection and said latch after a predetermined travel of said assembly, and control means for said device actuated by rotation of said assembly through a definite distance.

4. In a repeating mechanism, a rotatable assembly comprising a pair of relatively angularly adjustable arms carried by said assembly, a cyclic device for rotating said assembly from an initial position to a predetermined position, means for returning said assembly to its initial position, a motor for operating said cyclic device, and a circuit controller for the motor actuated by one of said arms for energizing the motor and by the other arm for deenergizing the motor, in response to rotation of said assembly.

5. In a repeating mechanism, a rotatable assembly comprising a pair of relatively angularly adjustable arms carried by said assembly, a cyclic device for rotating said assembly from an initial position to a predetermined position, means for returning said assembly to its initial position, a motor for operating said cyclic device, and a circuit controller for said motor, actuated by one of said arms for deenergizing the motor when the assembly reaches said predetermined position, and actuated by the other arm for energizing the motor when the assembly returns to its initial position.

6. In a repeating mechanism, a rotatable assembly, comprising a tubular outer shaft, means rotatably supporting said outer shaft, a segment secured to said outer shaft, an inner shaft rotatably supported within the outer shaft, an adjusting lever secured to said inner shaft, means carried by said lever and adapted to engage the segment whereby the inner shaft and the segment are locked for rotation as a unit, a pair of levers secured respectively to said shafts, means continuously urging said assembly to rotate in one direction, a cyclic device adapted to rotate the assembly in the opposite direction, latch means for preventing return of the assembly to its initial position in response to said continuously urging means, means controlling the operation of the cyclic device, one of said levers actuating said means to initiate operation of said device, the other lever actuating said means to stop operation of said device.

7. In a system of the character described, a cyclic device, an electric motor for operating said device through repeated cycles, a circuit for the motor, a repeater mechanism including a rotatable member operated in a step by step manner by said device from an initial position to a definite position, means urging said member to return to its initial position, a pawl for preventing return of said member to its initial position, electro-magnetic means for releasing said pawl, a circuit for said electromagnetic means, and a controller for both said circuits operated by the repeater mechanism, said controller being arranged to cause energization of one of said circuits when the rotatable member is in its initial position, and to cause energization of the other circuit when said member is in said definite position.

8. In a system of the character described, a cyclic device, an electric motor for operating said device through repeated cycles, a circuit for the motor, a repeater mechanism including a rotatable member, means forming a releasable connection between said device and said member whereby said device operates the member from an initial position to a definite position, means urging said member to return to its initial position, a pawl for preventing return of said member to its initial position, electromagnetic means for releasing said pawl as well as said connection, a circuit for said electromagnetic means, and a controller for both said circuits operated by the repeater mechanism, said controller being arranged to cause energization of one of said circuits when the rotatable member is in its initial position, and to cause energization of the other circuit when said member is in said definite position.

DAMIAN L. REYNOLDS.